US006981829B2

(12) United States Patent
Wilson

(10) Patent No.: US 6,981,829 B2
(45) Date of Patent: Jan. 3, 2006

(54) INCREMENTAL TENSION FASTENER ASSEMBLY

(75) Inventor: Larry J. Wilson, Commerce Township, MI (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

(21) Appl. No.: 10/486,118

(22) PCT Filed: Sep. 6, 2002

(86) PCT No.: PCT/US02/28382

§ 371 (c)(1),
(2), (4) Date: Feb. 6, 2004

(87) PCT Pub. No.: WO03/023235

PCT Pub. Date: Mar. 20, 2003

(65) Prior Publication Data

US 2004/0170485 A1  Sep. 2, 2004

Related U.S. Application Data

(60) Provisional application No. 60/318,097, filed on Sep. 6, 2001.

(51) Int. Cl.
*F16B 31/02* (2006.01)
(52) U.S. Cl. ............... 411/1; 411/8; 411/188; 411/147
(58) Field of Classification Search ............ 411/1, 411/7, 8, 9, 11, 14, 136, 147, 149, 16 D, 411/161, 187, 188, 368, 464, 969
See application file for complete search history.

(56) References Cited

U.S. PATENT DOCUMENTS

| 292,063 A | 1/1884 | Shailer |
| 752,628 A | 2/1904 | Miner |
| 889,593 A | 6/1908 | Fleischmann |
| 948,326 A | 2/1910 | Hesse |
| 1,622,581 A | 3/1927 | Gunkel |

(Continued)

FOREIGN PATENT DOCUMENTS

DE    298 15 492 U1    10/1998

(Continued)

*Primary Examiner*—Flemming Saether
(74) *Attorney, Agent, or Firm*—Dana Andrew Alden; Michael Pruden

(57) ABSTRACT

The fastener assembly comprises a torquing member and a clamping pressure member assembled together on a common axis. The torquing member has threads formed around the axis. An annular bearing surface extends around the axis on one end of the member. The clamping pressure member has an annular bearing surface formed around the axis on one end and an annular clamping surface extending around the axis on an opposite end. The annular bearing surface of the torquing member includes a first series of helically inclined surface segments extending about substantially the same axis as the threads and a second series of helically inclined surface segments extending about substantially the same axis as the threads but provided with a pitch substantially equal to or greater than that of the threads, with an opposite incline. The annual bearing surface on the clamping pressure member includes a first series of helically inclined surface segments extending about substantially the same axis as the threads, and a second series of helically inclined surface segments extending about substantially the same axis as the threads with a pitch substantially equal to or greater than that of the threads, with an opposite incline. Helically inclined bearing surfaces on the torquing member and the clamping pressure member engage each other in locking relationship.

14 Claims, 2 Drawing Sheets

U.S. PATENT DOCUMENTS

| | | | |
|---|---|---|---|
| 2,278,062 A | 3/1942 | De Koharovich | |
| 2,498,221 A | 2/1950 | Poupitch | |
| 2,685,812 A * | 8/1954 | Dmitroff | 411/7 |
| 2,779,379 A | 1/1957 | Willis | |
| 3,077,218 A | 2/1963 | Ziegler | |
| 3,221,792 A | 12/1965 | Poupitch | |
| 3,332,464 A | 7/1967 | Castel | |
| 3,438,416 A * | 4/1969 | Thurston | 411/134 |
| 3,762,455 A | 10/1973 | Anderson | |
| 4,431,353 A | 2/1984 | Capuano | |
| 4,793,752 A | 12/1988 | Frieberg | |
| 4,812,094 A | 3/1989 | Grube | |
| 4,941,787 A | 7/1990 | Shaffer | |
| 5,190,423 A * | 3/1993 | Ewing | 411/134 |
| 5,533,849 A | 7/1996 | Burdick | |
| 5,597,278 A | 1/1997 | Peterkort | |
| 5,626,449 A * | 5/1997 | McKinlay | 411/149 |
| 5,967,721 A * | 10/1999 | Giachinta et al. | 411/7 |
| 5,984,602 A | 11/1999 | Park | |
| 6,749,386 B2 | 6/2004 | Harris | |
| 2002/0039522 A1 | 4/2002 | Hartman et al. | |

FOREIGN PATENT DOCUMENTS

| | | |
|---|---|---|
| DE | 199 56 287 A1 | 5/2001 |
| GB | 285030 | 8/1928 |

* cited by examiner

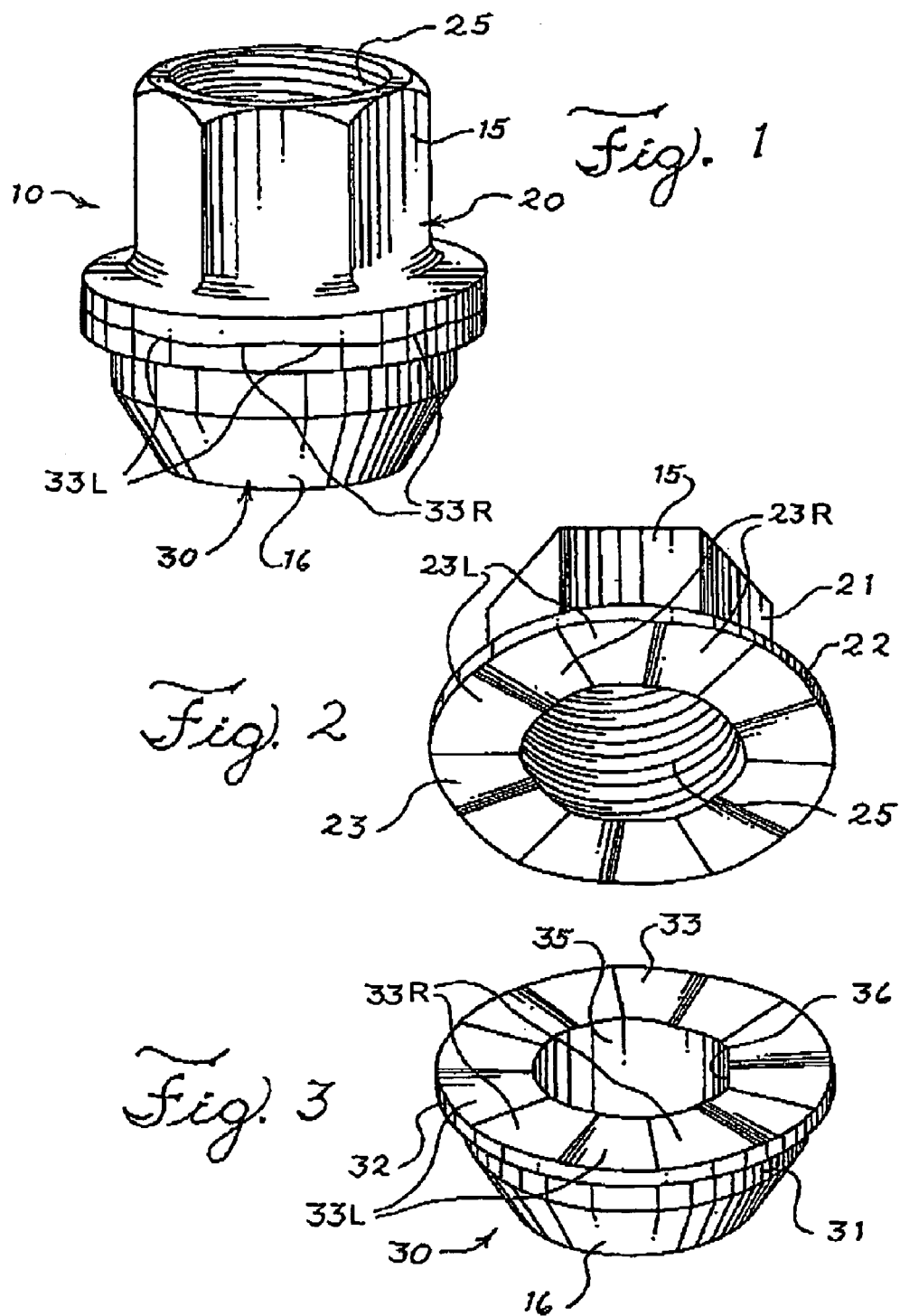

INCREMENTAL TENSION FASTENER ASSEMBLY

This is the national stage application of International Application No. PCT/US02/28382, published in English under PCT Article 21(2), and filed on Sep. 6, 2002, which claims the benefit of U.S. Provisional Application No. 60/318,097, filed Sep. 6, 2001. This application claims the benefit of U.S. Provisional Application No. 60/318,097, filed Sep. 6, 2001.

FIELD OF THE INVENTION

This invention relates generally to a threaded fastener. It relates particularly to a threaded fastener assembly characterized by its ability to provide incremental tension or clamp load and resistance to loosening.

BACKGROUND OF THE INVENTION

The physical property by which threaded fasteners perform their clamping function is tension, or clamp load. This clamp load is achieved by the application of rotational force, or torque. Fastener designers rely on empirical data accumulated from tests that plot the relationship of torque vs. tension. This torque-tension relationship can be significantly affected by friction in the joint, both in the thread and at the rotated clamp surface.

Extremely high friction can cause insufficient clamp load, resulting in joint looseness and possibly shear failure of the externally threaded component. Extremely low friction can cause clamp loads that exceed the fastener's tensile load capability at assembly, resulting in stretching to the point of failure. Worse yet, the fastener could be near the tensile limit at assembly and fail in the field due to normal additional loads applied during use. To avoid potential catastrophic tensile failure, designers typically design or use fasteners that have significantly greater strength than actually required.

Friction cannot be controlled very well in the typical manufacturing environment. Consequently, assembly processes are designed to identify suspect assemblies. Installation of fasteners is typically controlled by torque with resultant torque angle being monitored to identify potential faulty assembly. However, torque angle alone is less of an indicator of clamp load than torque since a torque value is utilized as a point to begin measuring torque angle. Very high torque angle could be an indicator of high friction that could detrimentally reduce the clamp load, or some other assembly characteristic that may not affect clamp load adversely. It is necessary to evaluate assemblies with high torque angles to determine if rework is required. This is a costly and inefficient use of manufacturing resources.

Another weakness of existing threaded fasteners is the potential for inadvertent loosening of the fastened joint due to cyclic loads or vibration. A cyclic load applied to the helical surface of the thread can result in a torque force inducing a rotation in the direction opposite to the original tightening rotation.

SUMMARY OF THE INVENTION

The present invention is embodied in a fastener assembly which achieves a desired clamp load with predictable consistency, and is considerably less affected by frictional variation than conventional fasteners. This clamp load is achieved incrementally, providing for the capability to select any of numerous load values with the same components. It further includes a mechanism that resists loosening due to vibration or cyclic loading. The invention also facilitates simple assembly, either manually or with computerized automation.

The fastener assembly comprises a nut or bolt with a mating washer or other component with which the clamping surface of the nut or bolt engages. The design of the mating surfaces is such that predictable tension can be incrementally applied through control of torque angle. This incremental application of tension by torque is alternated with increments of rotation imparting little or no increase in joint tension. Degree of rotation is identified with this feature and also an anti-loosening effect is achieved.

The mated bearing surfaces between the components consist of a series of alternating right hand and left hand, helically inclined surfaces. Right hand and left hand, in this context, means the same as applied to thread description. The axis of the helix is common with the axis of the threads of the nut or bolt and the hole in the washer or other component. The right hand helically inclined surfaces each have a pitch equal to the thread pitch of the fastener. The pitch of the left hand helical inclined surfaces can be varied to achieve the desired tension vs. torque angle characteristic. There are equal numbers of right hand and left hand surface segments in the bearing surfaces, each defining an equal arc. The sum of the arcs defined by the right and left hand segments is equal to 360°.

In application, the washer or non-threaded component of the assembly must not rotate freely against the surface of the clamped part. Conventional methods to increase friction or mechanically prevent rotation at this interface are employed, as necessary.

As the threaded fastener is rotated, contact between the nut or bolt and the washer is alternated between the right hand and left hand surface segments. When rotation occurs during contact between the right hand segments, tension does not increase. Rotation during contact between left hand segments results in an increase of joint tension. The tension increase vs. the total torque angle of the right hand and left hand segments is the same as the tension applied for the same torque angle of a standard fastener design of the same thread pitch.

The increment of tension increase per rotation through a left hand segment is empirically derived through testing. Each incremental increase in tension corresponds to an increase in torque applied. Torque is easily measurable and incremental increases can be identified. Controlling the count of these increases provides an identifiable and consistent clamp load. Computer or PLC controlled assembly equipment can be programmed to accomplish this. In manual assembly the incremental increases can be identified by "feel" and counted to achieve the same result.

In that the clamp load does not increase during rotation and contact between the right hand helical surface segments, clamp load also does not decrease during opposite rotation when these same surfaces are in contact. It is this characteristic that gives the fastener it's anti-loosening feature.

Computerized assembly equipment can be programmed to compare torque angle to applied torque. For the purpose of this invention, the program is designed to recognize when continuous rotation of the fastener results in alternating between increasing and non-increasing torque angle segments. When the program identifies two cycles of torque increase it identifies the starting point for counting cycles. After a pre-determined count is achieved, the assembly equipment stops rotating the fastener.

The program in its simplest form would require the user to input the cycle count at which to stop rotating. This would be determined by dividing the desired clamp force by a value empirically established for the pitch of the thread being used. Another approach is to have the values tabulated by thread pitch within the program. The user in this case would only be required to input the thread pitch and the desired clamp force. The program would calculate the required number of cycles.

BRIEF DESCRIPTION OF THE DRAWINGS

The invention, including its construction and operation, is illustrated diagrammatically and graphically in the following drawings:

FIG. 1 is a side perspective view of a fastener assembly comprising a nut and conical washer and embodying features of the present invention;

FIG. 2 is a bottom perspective view of the threaded nut seen in FIG. 1;

FIG. 3 is a top perspective view of the unthreaded washer seen in FIG. 1;

DESCRIPTION OF THE PREFERRED EMBODIMENT

Figure 4:
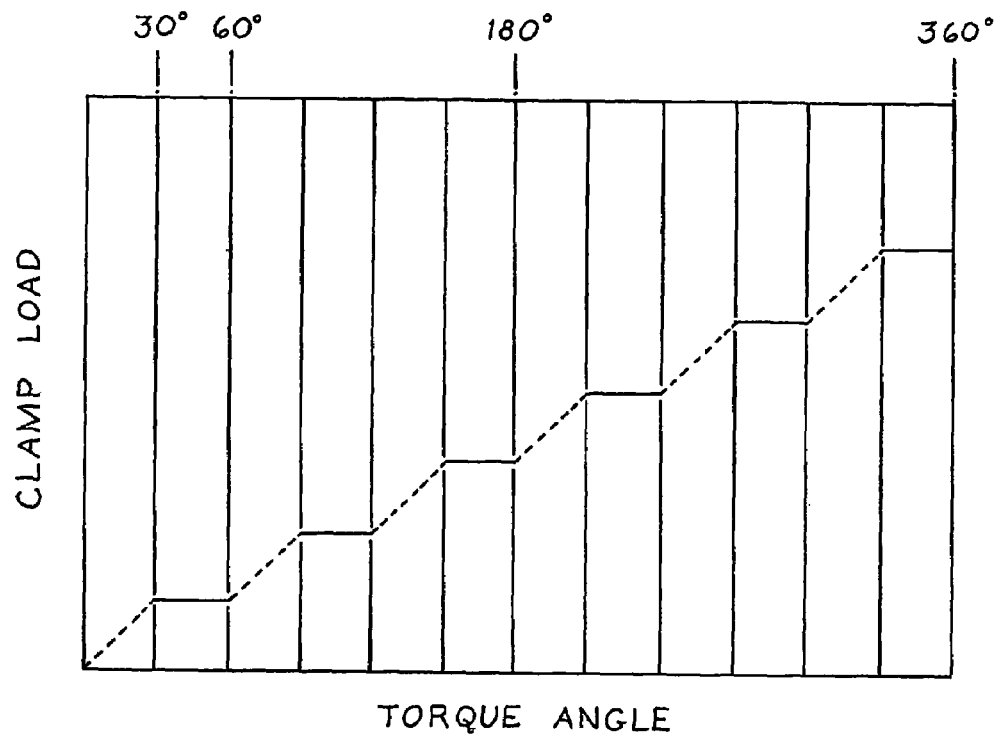
FIG. 4 is a graphic illustration of the relationship between torque angle and clamp load during application of a fastener assembly embodying features of the invention.

Referring now to the drawings, and particularly to FIG. 1, a fastener assembly embodying features of the invention is shown generally at 10. The fastener assembly 10 is of a configuration which might be employed as a lug nut fastening a vehicle wheel (not shown) to a wheel hub. As such it includes a hex-shaped head 15 and a frusto-conical base 16.

Referring now also to FIGS. 2 and 3, the assembly 10 comprises a nut 20 and a washer 30. The hex-shaped head 15 is formed on the nut 20. The frusto-conical base 16 is formed on the washer 30.

The nut 20 includes a nut body 21 which includes the hex-shaped head 15 and an annular inner flange 22. The annular inner flange 22 has an annular bottom bearing surface 23 which is generally undulated. As shown in FIGS. 1 and 2, the bearing surface 23 is segmented so as to define six left hand helically inclined surface segments 23L and six right hand helically inclined surface segments 23R. The total of twelve surface segments 23L and 23R evenly divide the 360° path of the surface 23 into 30° segments.

The nut body 21 is internally threaded at 25 in a conventional manner. The threads 25 extend helically around the inside of the nut body on a conventionally selected pitch X.

Each of the six right hand surface segments 23R is formed so that it extends helically about the same axis as that of the threads. Each surface 23R is, according helically inclined in the same direction as the threads.

Each of the six left hand surface segments 23L, on the other hand, lies on the surface of a helix inclined in the opposite direction. The pitch of each of these left hand helical inclined surfaces is Y. The pitch Y is selected to provide a predetermined tension increase for each degree (torque angle) of rotation of the nut 20 as it rotates through the 30° occupied by each surface segment 23L.

The washer 30 includes a washer body 31 which includes the frusto-conical base 16 and an annular outer flange 32. The annular outer flange 32 has an annular top bearing surface 33 which is generally undulating. As shown in FIGS. 1 and 3 the bearing surface 33 is segmented so as to define six left hand helically inclined surface segments 33L and six right hand helically inclined surface segments 33R. The total of twelve surface segments 33L and 33R once again evenly divide the 360° path of the surface 33 into 30° segments.

The washer body 31 has an unthreaded bore 35 through it. A flat 36 is formed inside the bore 35 on one side of it. The flat 36 is designed to cooperate with a corresponding flat formed on one side of a vehicle lug bolt, for example, to prevent the washer 30 from rotating while allowing it free to move axially. It should be understood, however, that this is just one way in which the washer 30 might be kept from rotating with the nut 20.

Each of the right hand surface segments 33R is formed so that it extends helically about the same axis as that of the threads 25 on the nut 20. Each surface 33R is, in turn, helically inclined and in the same direction as the threads.

Each of the six left hand surface segments 33L lies on the on the surface of a helix inclined in the opposite direction. The pitch of each of these left hand helical inclined surfaces is Y, the same pitch selected for the surface segments 23L on the nut 20.

When the fastener assembly 10 is installed on a vehicle lug bolt, the washer 30 seats in a conventional manner against the center plate of a wheel rim (not shown), with the frusto-conical base 16 in a correspondingly shaped depression. The frusto-conical base 16 forms a clamping surface. The nut 20 is threaded onto the lug bolt until its bearing surface 23 engages the bearing surface 33 on the washer 30.

Figure 5:
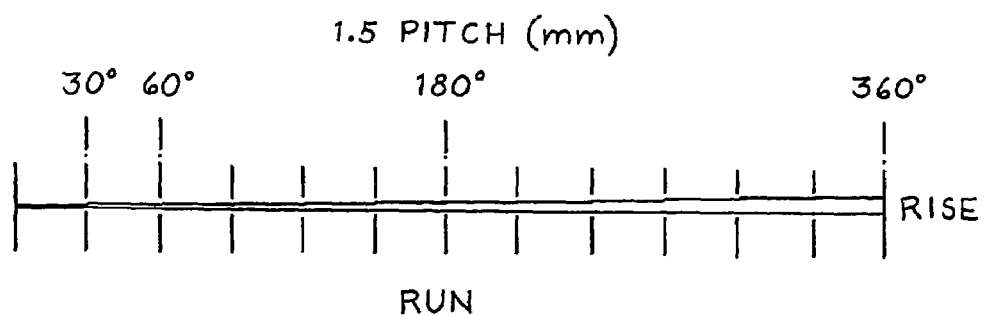
FIG. 5 is a graphic illustration of an actual 360° thread run versus clamp interference (axial travel of the nut) for a typical assembly embodying the invention.

Turning the nut 20 further causes the tension or clamping force exerted by the washer to increase incrementally each time left hand surface segments 23L slide up and over left hand surface segments 33L. As the nut 20 is torqued further, there is no increase in clamp load or tension as right hand surface segments slide over each other. This is illustrated graphically in FIG. 4, where clamp load increase is shown. FIG. 5, on the other hand shows the actual axial travel for a specific pitch during one 360° rotation of the nut 20, for example.

The amount of tension or clamping pressure is determined by the number of rotations the nut 20 makes and the pitch of the segments 23R and 33R. The clamping force desired can be achieved manually by counting segment passage or automatically by programming a computer driven torque wrench to do so.

The invention has been described in the context of a lug nut with a mating conical base washer. It should be understood, however, that it might also be applied to a wide range of fastener assembly configurations, including nut and flat washer assemblies or bolt and washer assemblies, for example.

What is claimed is:

1. A fastener assembly comprising:
   a) a torquing member and a clamping member assembled on a common axis;
   b) the torquing member is provided with threads formed around the axis and an annular bearing surface extending around the axis on one end;
   c) the clamping member is provided with an annular bearing surface formed around the axis on one end and facing the torquing member bearing surface;
   d) the annular bearing surface on the torquing member includes a plurality of helically inclined surface segments, wherein the surface segments include a first pitch that is substantially equal to a pitch on the threads and the surface segments include a second pitch, with opposite incline relative to the threads; and e) the annular bearing surface on the clamping member includes a plurality of helically inclined surface segments, wherein the surface segments include a first pitch that is substantially equal to the pitch on the threads and the surface segments include a second pitch with opposite incline relative to the threads.

2. The fastener of claim 1 further characterized in that:
a) the torquing member is provided with a first series of helically inclined surface segments, wherein the surface segments of the first series are provided with the first pitch; and
b) the clamping member is provided with a first series of helically inclined surface segments, wherein the surface segments of the first series are provided with the first pitch.

3. The fastener of claim 1 further characterized in that the helically inclined surface segments on the torquing member and the clamping member are generally complementary in shape.

4. The fastener of claim 1 further characterized in that the second pitch is substantially equal to the pitch on the threads.

5. The fastener of claim 1 further characterized in that the second pitch is different than the pitch on the threads.

6. The fastener of claim 1 further characterized in that the surface segments on at least one of the torquing member and the clamping member form an undulating bearing surface.

7. The fastener of claim 1 further characterized in that:
a) the torquing member exerts a clamp load on the clamping member as the torquing member is rotated onto a bolt; and
b) the helically inclined surface segments on the torquing member and the clamping member are dimensioned so that the clamp load is substantially constant while the helically inclined surface segments with the first pitch are in contact.

8. The fastener of claim 1 further characterized in that:
a) the torquing member exerts a clamp load on the clamping member as the torquing member is rotated onto a bolt; and
b) the helically inclined surface segments on the torquing member and the clamping member are dimensioned so that the clamp load increases while the helically inclined surface segments with the second pitch are in contact.

9. The fastener of claim 1 further characterized in that:
a) the torquing member exerts a clamp load on the clamping member as the torquing member is rotated onto a bolt; and
b) the surface segments on the torquing member and the clamping member are dimensioned so that the clamp load alternates between being increased and being substantially constant during rotation of the torquing member onto the bolt.

10. A fastener assembly comprising:
a) a torquing member and a clamping member assembled on a common axis;
b) the torquing member includes:
i) threads that are provided with a predetermined pitch and that are located around the axis;
ii) an annular bearing surface extending around the axis on one end;
c) the clamping member is provided with an annular bearing surface extending around the axis on one end and facing the torquing member bearing surface;
d) the annular bearing surface on the torquing member includes a first series of helically inclined surface segments and a second series of helically inclined surface segments, wherein the surface segments of the first series are provided with a pitch that is substantially equal to the predetermined pitch on the threads and the surface segments of the second series are provided with a pitch that is different than the predetermined pitch and inclined in the opposite direction; and
e) the annular bearing surface on the clamping member includes a first series of helically inclined surface segments and a second series of helically inclined surface segments, wherein the surface segments of the first series are provided with a pitch that is substantially equal to the predetermined pitch on the threads, and the surface segments of the second series are provided with a pitch that is different than the predetermined pitch and inclined in the opposite direction.

11. The fastener of claim 10 further characterized in that the helically inclined surface segments of the first series alternate with the helically inclined surface segments of the second series in each of the annular bearing surfaces.

12. The fastener of claim 10 further characterized in that the first and second series of helically inclined surface segments in the torquing member bearing surface being equal in number to each other.

13. The locking fastener of claim 12 further characterized in that the first and second series of helically inclined surface segments in the member bearing surface being equal in number to each other.

14. The fastener of claim 10 further characterized in that:
a) the annular bearing surface on the torquing member exerts a clamp load on the annular bearing surface on the clamping member during rotation of the torquing member onto a bolt; and
b) the annular bearing surface on the torquing member and the annular bearing surface on the clamping member are shaped so that the clamp load alternates between being increased and being substantially constant during rotation of the torquing member onto the bolt.

* * * * *